United States Patent [19]
Chien

[11] Patent Number: 5,754,986
[45] Date of Patent: May 26, 1998

[54] WATER-SAVING DEVICE OF WATER TANK FOR FLUSH TOILET

[76] Inventor: Chuan-Tai Chien, No. 1-2, An Tung St., Taipei, Taiwan

[21] Appl. No.: 748,169
[22] Filed: Nov. 12, 1996
[51] Int. Cl.$^6$ ................................................ E03D 1/14
[52] U.S. Cl. ............................................. 4/327; 4/326
[58] Field of Search ............................ 4/326, 327, 324, 4/325

[56] References Cited

U.S. PATENT DOCUMENTS

| | | | |
|---|---|---|---|
| 3,939,507 | 2/1976 | Clark | 4/327 |
| 3,964,109 | 6/1976 | Street et al. | 4/327 |
| 4,115,882 | 9/1978 | Paulus | 4/327 |
| 4,185,338 | 1/1980 | Bresnyan | 4/327 |

*Primary Examiner*—David J. Walczak
*Attorney, Agent, or Firm*—Pro-Techtor International

[57] ABSTRACT

A water-saving flush mechanism installed in the water tank of a flush toilet. In addition to providing an inlet control structure with an inlet pipe and a water level float ball, an outlet pipe is provided on an outlet seat. The outlet pipe is in communication with a telescopic overflow pipe. The outlet pipe includes a lower outlet pipe and an upper outlet pipe. The upper and lower outlet pipes are nested and are adjustable for height. A connecting rod on a side of the lower water outlet pipe is pivotally attached to the overflow pipe. A plate is provided on and end of a shaft. A lower pull rope is tied to the outlet pipe and pulls open the lower edge of the lower outlet pipe. A rod with a covering shaft is pivotally attached to one side of the upper outlet pipe. An outlet pipe cover at another end of the covering shaft closes the top opening of the upper outlet pipe and is provided with a pull rope that pulls the outlet pipe cover to open the top opening. Through pulling the different pull ropes, flushing by means of opening the top opening or the lower section of the outlet pipe is controlled so as to vary the flushing volume. The pull ropes are tied to an actuating device which can be installed in different positions in the water tank.

14 Claims, 8 Drawing Sheets

WATER-SAVING DEVICE OF WATER TANK FOR FLUSH TOILET

BACKGROUND OF THE INVENTION

1. Field of the Invention

The present invention is related to a water saving device and in particular is a water-saving device for a water tank of a flush toilet. The device is suitable for various water tanks, and is capable of variable water supply depending on the flushing volume required, thereby achieving the purpose of saving water.

2. Description of the Prior Art

Figure 1:
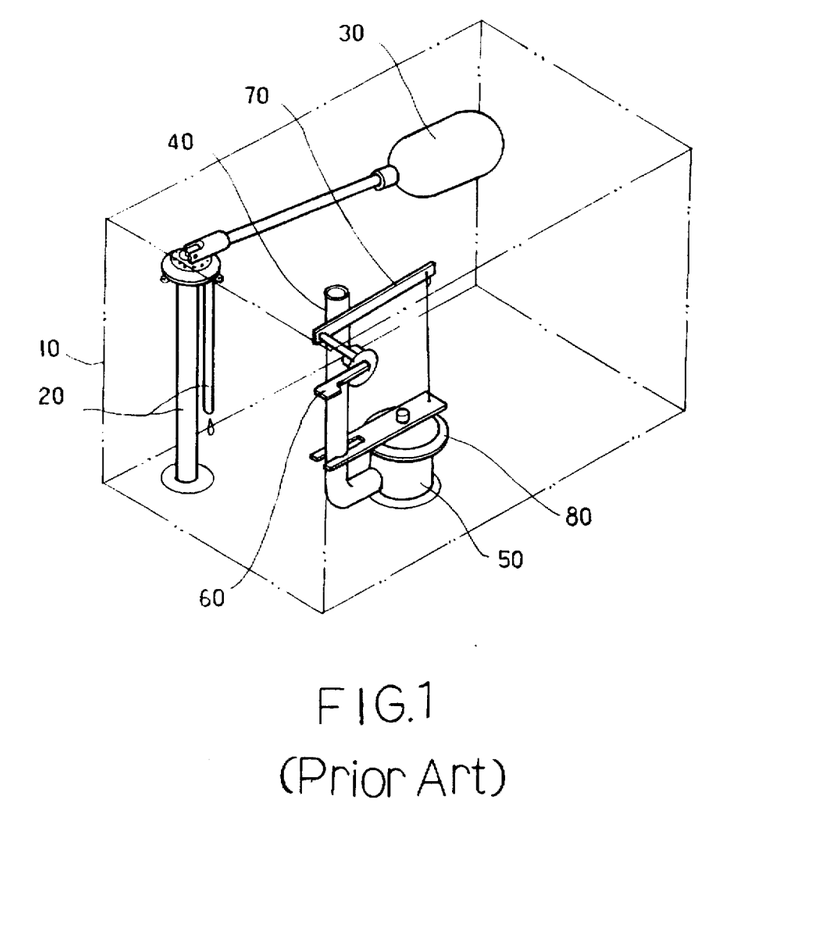
FIG. 1 is a perspective view of a conventional water tank of a flush toilet.

The conventional flush toilet 10 as shown in FIG. 1 consists of an inlet pipe 20 with a lateral float ball 30 as a control structure for influent and maximum water level. An overflow pipe 40 and a connected outlet pipe serve as a control structure for full water level and water supply. When flushing, the user pushes down an actuating knob 60 that activates a pull rod 70 that opens cover 80, thereby allowing water to flow out of the outlet 50. After flushing, the outlet cover 80 covers the outlet pipe 50 to stop the flow of water. Water then flows into the water tank 10 from the inlet pipe 20 and fills the tank in preparation for the next flush.

However, the conventional water tank of a flush toilet has serious defects in the aspect of flushing water volume control. Regardless of how much flushing water volume is required, the flushing volume is always the same. In other words, when the actuating knob 60 is pushed down each time, all the water volume under the control of the float ball 30 in the water tank is used. Such flushing may be required for flushing solid waste, but is more than is required for liquid waste. In addition, the flushing frequency for an average individual (about 5 times) for urination is much higher than that for solid waste (about 1 time daily). Therefore a large amount of water is wasted when disposing of liquid waste.

SUMMARY OF THE INVENTION

The present invention is a water-saving flush mechanism. In the water tank of a flush toilet, in addition to providing an inlet control structure with an inlet pipe and a water level float ball, an outlet pipe is provided on an outlet seat. The outlet pipe is in communication with a telescopic overflow pipe. The outlet pipe includes a lower outlet pipe and an upper outlet pipe. The upper and lower outlet pipes are nested and are adjustable for height. A connecting rod on a side of the lower water outlet pipe is pivotally attached to the overflow pipe. A plate is provided on and end of a shaft. A lower pull rope is tied to the outlet pipe and pulls open the lower edge of the lower outlet pipe. A rod with a covering shaft is pivotally attached to one side of the upper outlet pipe. An outlet pipe cover at another end of the covering shaft closes the top opening of the upper outlet pipe and is provided with a pull rope that pulls the outlet pipe cover to open the top opening. Through pulling the different pull ropes, flushing by means of opening the top opening or the lower section of the outlet pipe is controlled so as to vary the flushing volume.

The upper and lower pull ropes are tied to an actuating device which can be installed in different positions in the water tank. The actuating device includes a pin at the end of an operating lever of an actuating knob. Two pull rods are pivotally installed on an L-shaped frame. The inner ends of these two pull rods are laterally offset. The outer ends of the pull rods are tied to the upper and lower pull ropes. When the actuating knob is pressed or pulled, the pin pushes or pulls one of the pull rods so as to pull the upper or lower pull ropes to flush the toilet.

Another actuating device includes a snap ring inserted at the end of the operating lever of the actuating knob. A pull rod is pivotally installed on an L-shaped frame. The inner end of the pull rod contacts the end of the operating lever. The outer end of the pull rod and clip opening of the snap ring are tied to upper and lower pull ropes respectively. When the actuating knob is pressed or pulled, the upper or lower pull rope is pulled to flush the toilet.

Another embodiment of the device includes an outlet device on the side wall of the inlet pipe. A lateral pipe is formed on the inlet pipe wall and includes an outlet and an outlet pipe connect to the flush toilet. A plunger inside the lateral pipe closes the passage by water pressure. A grooved rod is pivotally attached to the upper side of the inlet pipe wall and to the actuating lever through a fulcrum shaft. One end of the operating lever and the connecting rod of the lower outlet pipe pull the pull rope. Another end of the operating lever contacts the plunger.

DETAILED DESCRIPTION OF THE PREFERRED EMBODIMENTS

Figure 2:
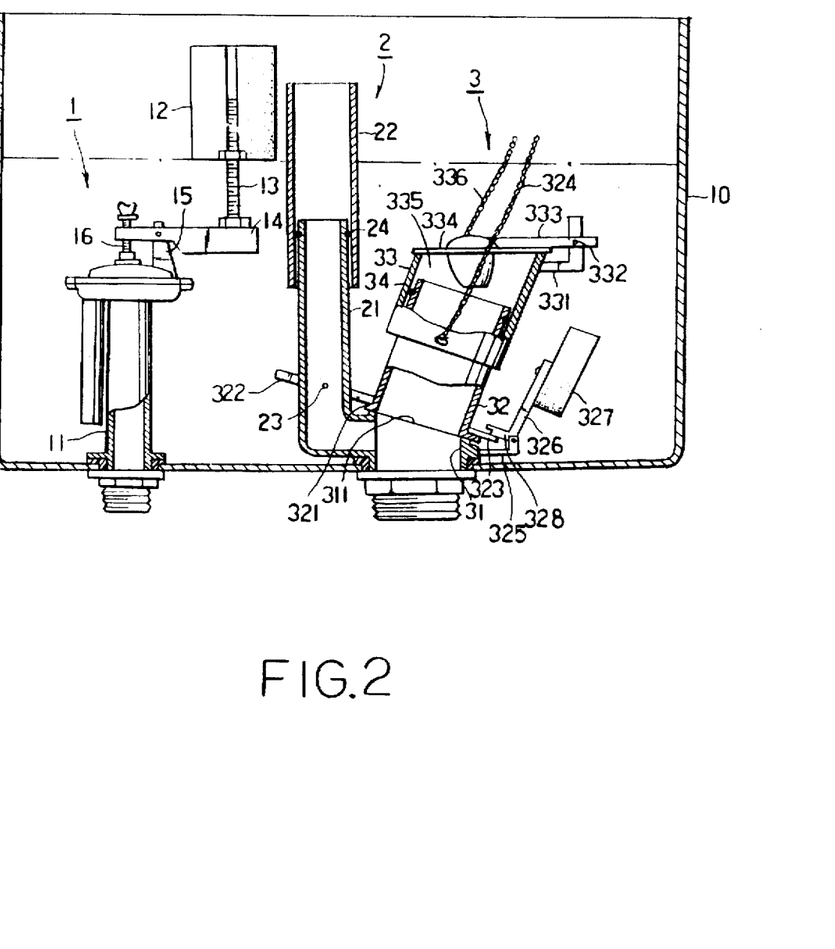
FIG. 2 is a front view of an embodiment of the present invention with a partial cross section.
Figure 3:
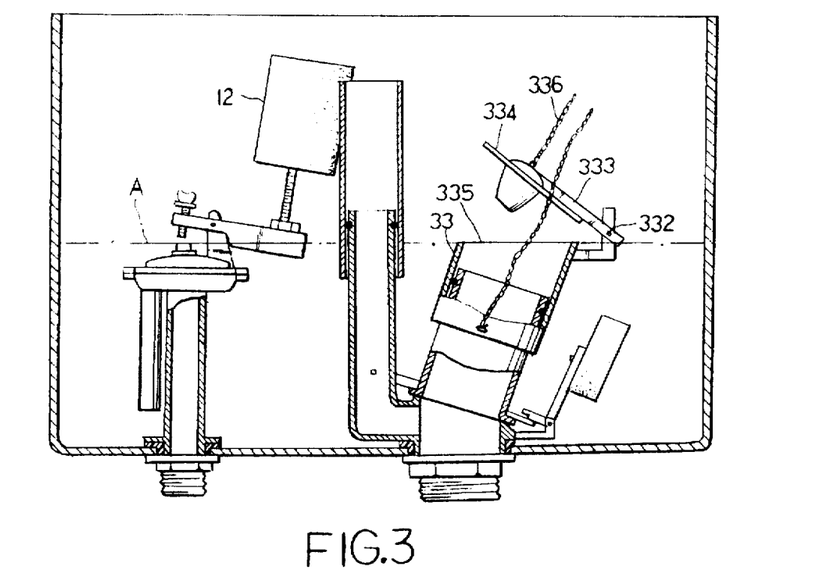
FIG. 3 is a view with the outlet pipe cover opened.
Figure 4:
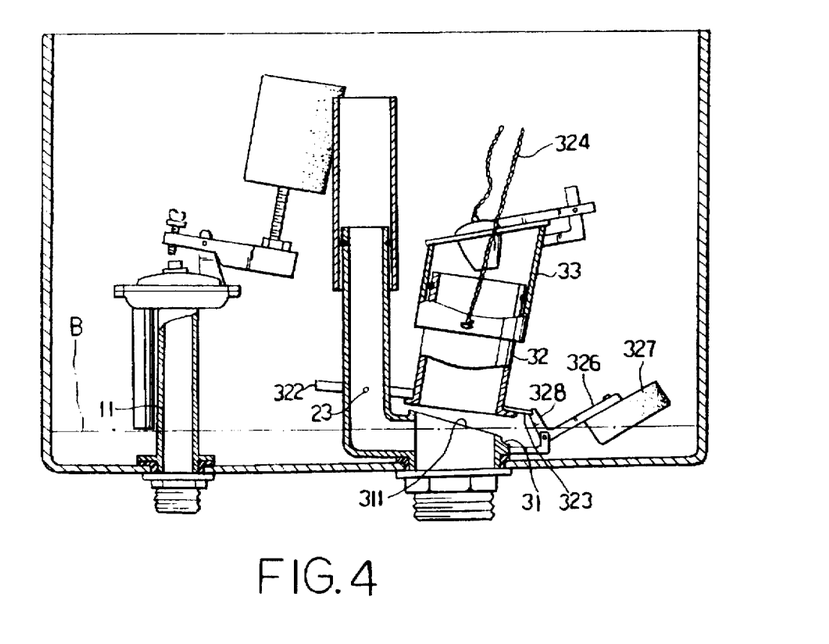
FIG. 4 is a view with the lower outlet pipe opened.

Referring first to FIGS. 2–4, the present invention comprises an inlet device 1, an overflow device 2, an outlet device 3, and an actuating device 4 installed inside a water tank 10. The actuating knob of the actuating device 4 is installed outside the water tank 10.

The inlet device 1 comprises an inlet pipe 11 and a float ball 12 for inlet and maximum water level control. A float is provided a one end of a lever 14 and includes an adjustable bolt 13. A supporting seat 15 is pivotally installed on a central part of the lever 14. A second end of the lever 14 is provided with a contact rod 16 which controls the opening and closing of a valve (not shown in the figures) at the top of the inlet pipe 11. The adjustable bolt 13 at the bottom end of float 12 can adjust the height of float 12 to regulate the height of the maximum water level in the water tank.

The overflow device 2 comprises a lower overflow pipe 21 and an upper overflow pipe 22 nested in each other. The upper overflow pipe 22 can be raised and lowered to regulate the overflow level. A gasket 24 is secured between the lower overflow pipe 21 and the upper overflow pipe 22. The gasket 24 seals the space between the lower and upper overflow pipes and secures the upper overflow pipe 22 at a desired height.

The bottom end of the lower overflow pipe 21 is in communication with an outlet pipe seat 31 of the outlet device 3. When the inlet control of inlet device 1 is inoperative and allows the water level in the water tank 10 to rise above the top end of upper overflow pipe 22, the excess water flows to the toilet through the overflow pipe through the outlet pipe seat 31 so that water will not overflow out of the water tank.

The outlet device 3 comprises an outlet pipe seat 31, a lower outlet pipe 32, and an upper outlet pipe 33. One side of the outlet pipe seat 31 is in communication with the bottom end of lower overflow pipe 21. The bottom edge 321 of lower outlet pipe 32 normally covers the top opening 311 of outlet pipe seat 31. A connecting rod 322 is pivotally connected to a side of the bottom edge 321 by a shaft 23 on the lower overflow pipe 21. A plate 323 is also affixed to the bottom edge 321. A lower pull rope 324 is tied to the wall of lower outlet pipe 32 or upper outlet pipe 33. Pulling the pull rope 324 opens the lower outlet pipe 32 as it pivots about shaft 23. A grooved rod 325 on one side of the outlet pipe seat 31 acts as a pivot point for an L-shaped lever 326. One arm of the L-shaped lever 326 is provided with a floating body 327. A second arm of the L-shaped lever 326 presses against the plate 323 of lower outlet pipe 32 to keep the lower outlet pipe 32 temporarily open. An L-shaped rod 331 is affixed to one side of the upper outlet pipe 33. A first end of a covering rod 333 is pivotally mounted on said L-shaped rod through a pivot shaft 332. A second end of the covering rod 333 includes an outlet pipe cover 334 which covers the top opening 335 of upper outlet pipe 33. An upper pull rope 336 is tied to the outlet pipe cover 334, and when the upper pull rope 336 is pulled, it opens the top opening 335 of upper outlet pipe 33.

The lower outlet pipe 32 and upper outlet pipe 33 adjustably nest with each other, thereby regulating the height of the outlet device 3. The height of the outlet in turn controls the flushing volume. One means of accomplishing the height adjustment is to install a rubber gasket 34 between the two sections. This seals the area between the two sections and holds the upper outlet pipe 33 at the desired height.

FIGS. 3 and 4 illustrate the operation of the present invention when flushing. When a user wants a low volume flush, he activates the upper pull ropes 336, which opens outlet cover 334. This allows water to flow out of the tank 10 until the water level reaches level A shown in FIG. 3.

As shown in FIG. 4, if the user desires a higher volume flush, he actuates the lower pull rope 324. This raises the upper and lower outlet pipe 32, 33, allowing water to flow through opening 311. Pipes 32, 33 are held in place by the leg 328 of the L-shaped lever 326. When the water level falls to level B, the float 327 will cause leg 328 to disengage from the outlet pipe, thereby closing opening 311.

It can be seen that the difference in volume between the low volume flush and the high volume flush is A-B times the area of the tank 10.

Figure 6:
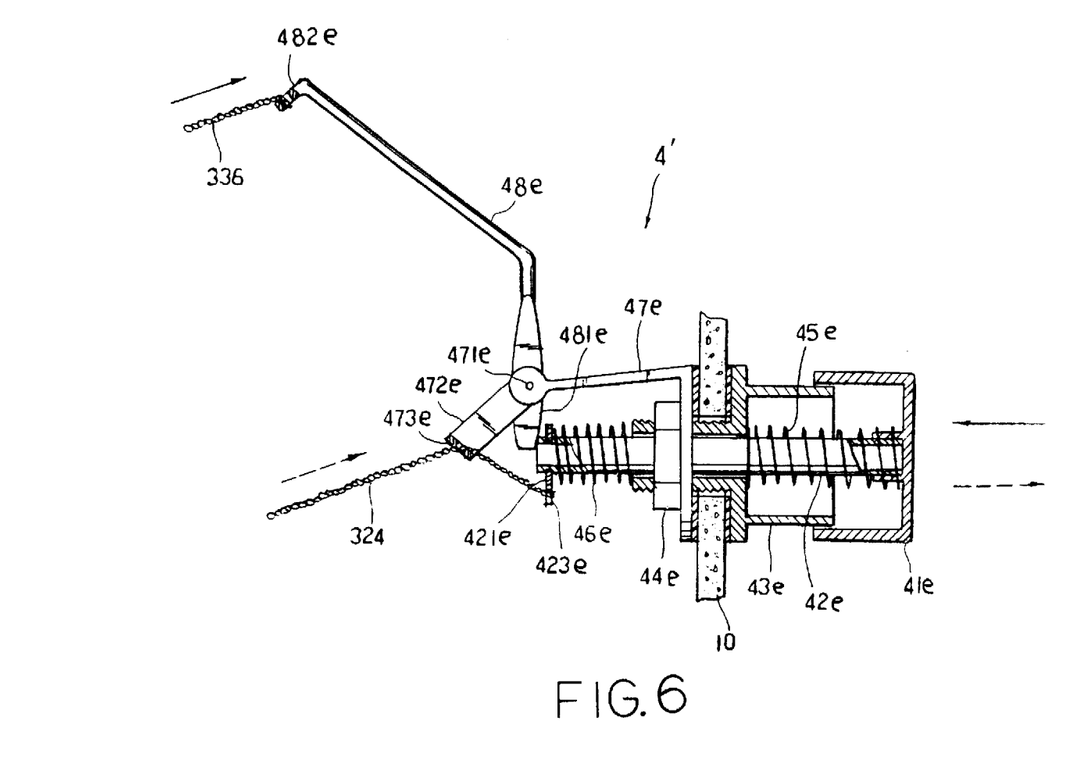
FIG. 6 is a view of another actuating device of the present invention.
Figure 7:
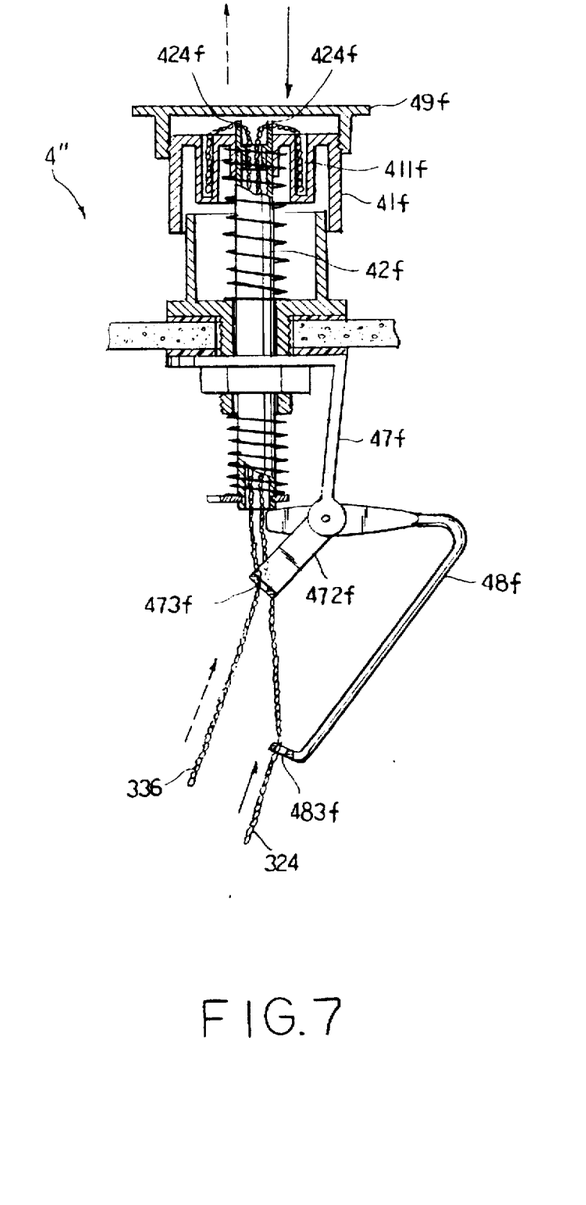
FIG. 7 is a structural view of still another actuating device of the present invention.

The upper and lower pull ropes 336, 324 are connected to the actuating device 4. Multiple embodiments of the actuating device 4 are shown in FIGS. 5 to 7.

Figure 5:
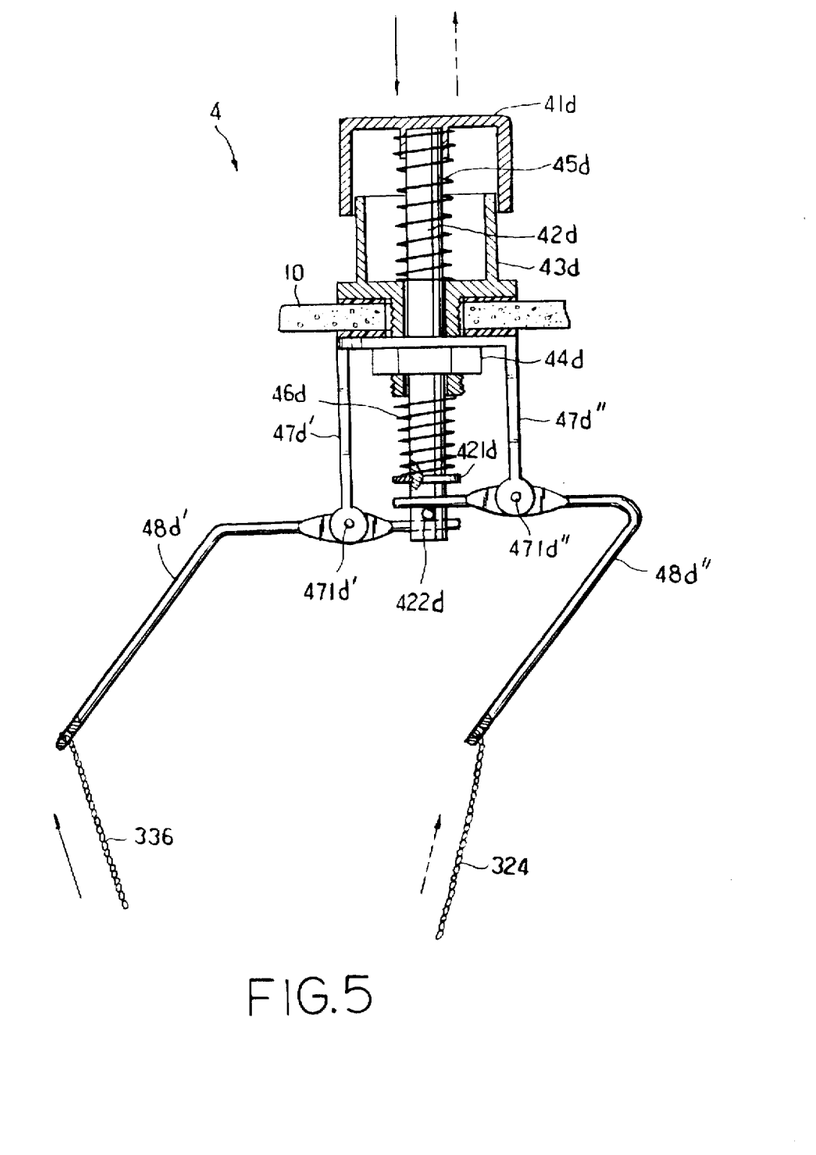
FIG. 5 is a view of an actuating device of the present invention.

As shown in FIG. 5, the actuating device 4 comprises an actuating knob 41d with an operating lever 42d, a solenoid seat 43d, a nut 44d, an outer spring 45d, an inner spring 46d, two L-shaped frames 47d', 47d" and two pull rods 48d', 48d".

The solenoid seat 43d and L-shaped frames 47d', 47d" are fixed on the wall of water tank 10 through the nut 44d. The operating lever 42d of the actuating knob 41d passes through the solenoid seat 43d. A snap ring 421d is inserted near the inner end of operating lever 42d. A pin 422d is provided at the outer end of operating lever 42d. One end of each of the two frames 47d', 47d" is pivotally joined with one of the two pull rods 48d', 48d" respectively through fulcrum shafts 471d', 471d". The pull rods 48d', 48d" are laterally offset. Distal ends of the pull rods 48d', 48d" are tied to the upper pull rope 336 and the lower pull rope 324 respectively.

The actuating device can be installed in any position on the water tank of the flush toilet. When the actuating knob 41d is pressed down, the outer spring 45d is compressed and the pin 422d pushes down the inner end of pull rod 48d'. This pulls the outer end of rod 48d' upward, thereby actuating upper pull rope 336, and triggering the low volume flush. When the pressure on knob 41d is released, the actuating knob 41d is restored to its original position through the force of outer spring 45d.

When the knob 41d is pulled upward, the inner spring 46d is compressed. The pin 422d pulls the outer end of pull rod 48d' upward, pulling the distal end of pull rod 48d' upward. This pulls the lower pull rope 324 upward to trigger the high volume flush.

As shown in FIG. 6, an alternate actuating device 4' comprises an actuating knob 41e with an operating lever 42e, a solenoid seat 43e, a nut 44e, an outer spring 45e, an inner spring 46e, an L-shaped frame 47e, and a pull rod 48e.

The solenoid seat 43e and the L-shaped frame 47e are fixed on the wall of the water tank 10 by the nut 44e. The operating lever 42e passes through the solenoid seat 43e, and a snap ring 421e is inserted near the inner end of operating lever 42e. One end of the frame 47e is pivotally attached to the pull rod 48e through a fulcrum shaft 471e. The inner end 481e of the pull rod 48e contacts the end of operating lever 42e. The outer end 482e of pull rod 48e and the clip opening 423e on the snap ring 421e are tied to the upper pull rope 336 and the lower pull rope 324 respectively. In addition, a lug 427e is formed at one end of the frame 47e and is provided with an annular hole 473e. The lower pull rope 324 passes through the annular hole 473e and then is tied to the clip opening 423e on the snap ring 421e so as to keep the desired direction of tensile force on the lower pull rope 324.

The foregoing actuating device 4' is preferably installed on the front or sides of the water tank 10 of a flush toilet. When the knob 41e is pressed inward, the outer spring 45e is compressed so that the operating lever 42e actuates the inner end 481e of pull rod 48e inward and the outer end 482e outward. This pulls the upper pull rope 336 outward to actuate the low volume flush. When the pressure on knob 41e is released, the actuating knob 41e is restored to its original position through the force of outer spring 45e.

When the knob 41e is pulled outward, the inner spring 46e is compressed. The lower pull rope 324 is directly pulled outward to actuate the high volume flush.

The structure of another alternate actuating device 4" is shown in FIG. 7. It is generally the same as that shown in FIG. 6; however, the operating lever 42f is hollow. The top end of operating lever 42f is provided with two opposing clip openings 424f. In addition, a receiving groove 411f is included in the actuating knob 41f. The upper pull rope 336 and the lower pull rope 324 are attached to the two clip openings 424f at the top end of operating lever 42f after passing through the annular hole 483f at an outer end of pull rod 48f, annular hole 473f on the lug 472f, and the hollow interior of operating lever 42f respectively. The remaining pull rope is disposed in the receiving groove 411f of the actuating knob 41f. A knob cover 49f covers the actuating knob 41f.

The actuating device 4" shown in FIG. 7 is preferably installed on the top side of the water tank 10 of a flush toilet. When the knob 41f is pressed down, upper pull rope 336 is pulled upward so as to actuate the low volume flush. When the actuating knob 41f is pulled upward, the lower pull rope 324 is pulled upward to actuate the high volume flush.

Figure 8:
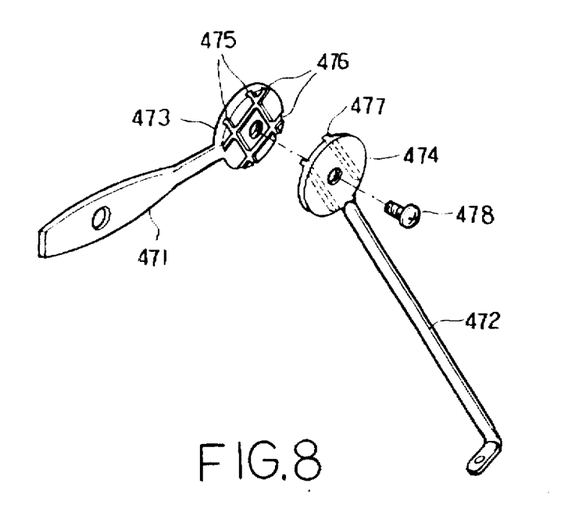
FIG. 8 is an exploded view of a pull rod of an actuating device of the present invention.
Figure 9:
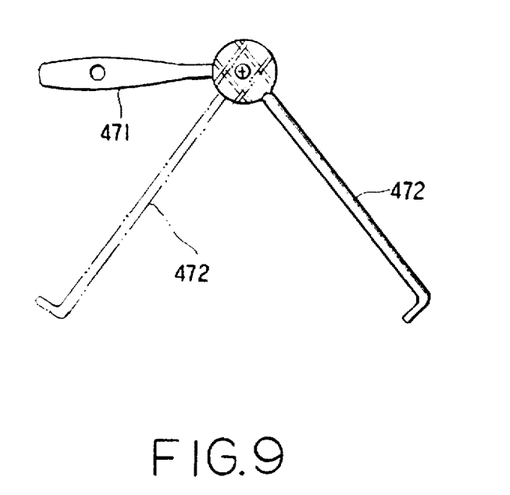
FIG. 9 is a front view of the pull rod as shown in FIG. 8.

As shown in FIGS. 8 and 9, the pull rod may also comprise a first rod 471 and a second rod 472 with joint pieces 473, 474. Joint piece 473 is provided with two grooves 475, 476. Joint piece 474 is provided with ridges 477 that are received in the grooves 475, 476. The joints 473, 474 are fixed together with a screw 478. The second rod 472 can be held in different orientations by inserting the ridges 477 into the grooves 475 or 476 as shown in FIG. 9.

Figure 10:
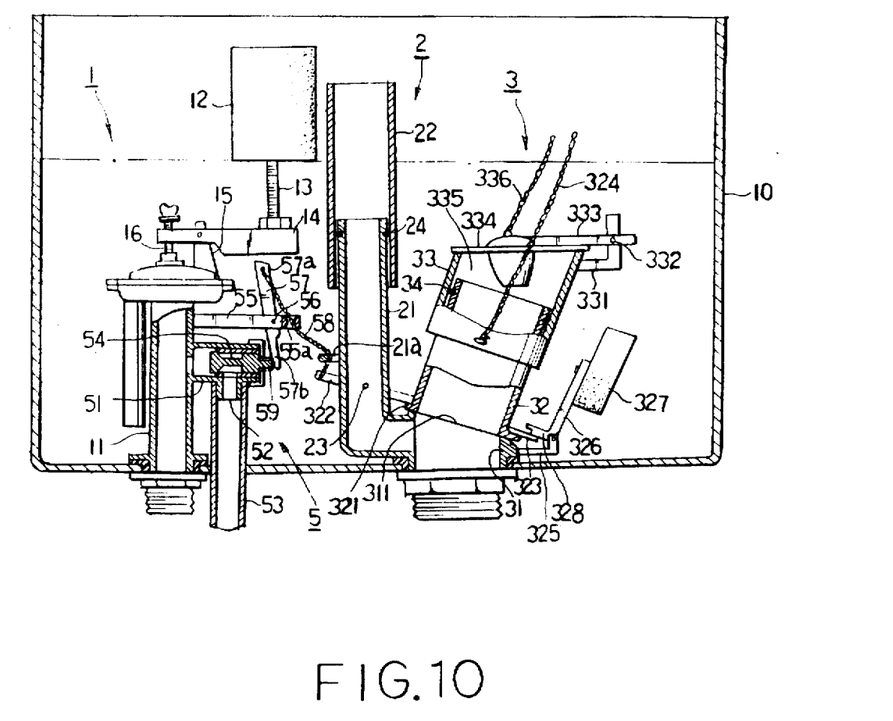
FIG. 10 is a view of another embodiment of the present invention.

Another embodiment of the present invention is shown in FIG. 10. An outlet device 5 is attached to one wall of an inlet pipe 11. A lateral pipe 512 with an outlet 52 extends from the inlet pipe 11. An outlet pipe 53 is connected to the flush toilet. An operating plunger 54 is provided inside the lateral pipe 51 to close the passage of outlet 52 by water pressure. A rod 55 on an upper side wall of inlet pipe 11 is provided with a pivoting operating lever 57 through a fulcrum shaft 56. One end 57a of operating lever 57 is tied to the connecting rod 322 of the lower outlet pipe 32 through an outlet pull rope 58. Another end 57b of the lever 57 presses against the end 59 of plunger 54. The outlet pull rope 58 passes through an annular hole 21a on the lower overflow pipe 21 and an annular hole 55a on the grooved rod 55. The pull rope 58 is tied at on end 57a of operating lever 57 so as to keep the desired tensile force direction of outlet pull rope 58.

When operating the pull rope 324 to actuate the connecting rod 322, the outlet pull rope 58 will pull the end 57a of the operating lever 57 so that end 57b depresses the plunger 54 to open the passage of outlet 52. Meantime, end 57a also presses against the bottom of float lever 14 and closes the valve at the top end of the inlet pipe. Therefore, in addition to the water volume in the water tank being supplied to the flush toilet through the top opening 311 of outlet pipe seat 31, the water inflow from the inlet pipe 11 will also supply water to the flush toilet simultaneously through the outlet 52 and outlet pipe 53 of outlet device 5 to create a pressurized flushing action.

The above disclosure is not intended as limiting. Those skilled in the art will readily observe that numerous modifications and alterations of the device may be made while retaining the teachings of the invention. Accordingly, the above disclosure should be construed as limited only by the restrictions of the appended claims.

I claim:

1. A water-saving device for a water tank of a flush toilet comprising:

an inlet device including an inlet pipe and a first float means, said inlet device controls a flow of water into the water tank, and said inlet device controls a maximum water level in the water tank, an overflow device including an overflow pipe, an outlet device, said overflow pipe is in communication with an outlet pipe seat of said outlet device, and an actuating device that triggers a first flush mode and a second flush mode, said second flush mode releases a higher volume of water from the water tank through said outlet device than does said first flush mode; wherein said outlet device further comprises a lower outlet pipe and an upper outlet pipe, said lower outlet pipe comprises a means to cover a top opening of said outlet pipe seat, a connecting rod is connected to said lower outlet pipe and pivotally connected to said overflow device by a shaft, a grooved rod on a side of said outlet pipe seat acts as a pivot point for an L-shaped lever, a first arm of said L-shaped lever provides a mount for a second float means, a second arm of said L-shaped lever presses against a plate of said lower outlet pipe to maintain said outlet device in an open position when actuated, said upper outlet pipe comprises an L-shaped rod installed on a side of said upper outlet pipe, a first end of a covering rod is pivotally connected to said L-shaped rod through a pivot shaft, a second end of said covering rod includes a means to cover a top opening of said upper outlet pipe, an upper pull rope is connected to said means to cover said top opening of said upper outlet pipe, and a lower pull rope is connected to said outlet device; such that a user causes said actuating device to actuate said upper pull rope to trigger said first flush mode by opening said means to cover said top opening of said upper outlet pipe, and the user causes said actuating device to actuate said lower pull rope to trigger said second flush mode, said lower pull rope lifts said means to cover said top opening of said outlet pipe seat, said outlet device being held in position during said second flush mode by a leg of said L-shaped lever, and as water flows from the water tank, said second float means causes said leg to disengage from said outlet device.

2. The water-saving device of claim 1 wherein:

said upper outlet pipe is nested with said lower outlet pipe such that an overall height of said outlet device is adjustable.

3. The water-saving device of claim 2 wherein:

a rubber gasket is installed between said lower outlet pipe and said upper outlet pipe to seal an open area between said lower outlet pipe and said upper outlet pipe, and to hold said upper outlet pipe at a desired position to establish the overall height of said outlet device.

4. The water-saving device of claim 1 wherein:

said overflow device comprises an upper overflow pipe nested with a lower overflow pipe such that an overall height of said overflow device is adjustable.

5. The water-saving device of claim 4 wherein:

a rubber gasket is installed between said lower overflow pipe and said upper overflow pipe to seal an open area between said lower overflow pipe and said upper overflow pipe, and to hold said upper overflow pipe at a desired position to establish the overall height of said overflow device.

6. The water-saving device of claim 1 wherein:

said first float means includes an adjustable bolt to regulate an upper water level in the water tank.

7. The water-saving device of claim 1 wherein:

said actuating device comprises an actuating knob with an operating lever, a solenoid seat, a nut, an outer spring, an inner spring, two L-shaped frames, and two pull rods, said solenoid seat and said L-shaped frames are fixed on a wall of the water tank by means of said nut, said operating lever of said actuating knob passes through said solenoid seat, a snap ring is inserted near an inner end of said operating lever, a pin is provided at an outer end of said operating lever, a first end of each of said frames is pivotally joined with one of said pull rods through a fulcrum shaft, said pull rods are laterally offset, distal ends of said pull rods are tied to said upper pull rope and said lower pull rope respectively; such that when said actuating knob is pressed, said outer spring is compressed and said pin pushes down an inner end of a first one of said pull rods, thereby pulling an outer end of said first pull rod upward, thereby actuating said upper pull rope and triggering said first flush mode, and when pressure on said actuating knob is released, said actuating knob is restored to an at-rest position through the force of said outer spring, and when said actuating knob is pulled upward, said inner spring is compressed and said pin pulls an outer end of said first pull rod upward, thereby pulling said distal end of said first pull rod upward, thereby pulling said lower pull rope upward and triggering said second flush mode.

8. The water-saving device of claim 7 wherein:

at least one of said pull rods comprises a first rod with a joint piece and a second rod with a joint piece, a first one of said joint pieces is provided with at least two sets of grooves, and a second one of said joint pieces is provided with ridges that are received in said grooves, said joint pieces are joined with a screw such that said first and said second rod are held in a first orientation when said ridges are received in a first of said sets of grooves, and said first and said second rod are held in a second orientation when said ridges are received in a second of said sets of grooves.

9. The water-saving device of claim 1 wherein:

said actuating device comprises an actuating knob with an operating lever, a snap ring, a solenoid seat, a nut, an outer spring, an inner spring, an L-shaped frame, and a pull rod, said solenoid seat and said L-shaped frame are fixed on a wall of the water tank by the nut, said operating lever passes through said solenoid seat, and said snap ring is inserted near an inner end of said operating lever, one end of said L-shaped frame is pivotally attached to said pull rod through a fulcrum shaft, an inner end of said pull rod contacts an end of said operating lever, an outer end of said pull rod is connected to said upper pull rope and a clip opening on said snap ring is connected to said lower pull rope; such that when said actuating knob is pressed, said outer spring is compressed so that said operating lever pushes said inner end of said pull rod inward and said outer end outward of said pull rod outward, causing said upper pull rope to actuate said first flush mode, and when pressure on said actuating knob is released, said actuating knob is restored to an at-rest original position through the force of said outer spring; and when said actuating knob is pulled, said inner spring is compressed thereby causing said lower pull rope to actuate said second flush mode.

10. The water-saving device of claim 9 wherein:

a lug is formed at one end of said frame, said lug is provided with an annular hole, said lower pull rope passes through said annular hole and is connected to said clip opening on said snap ring so as to maintain a desired tensile force.

11. The water-saving device of claim 10 wherein:

a top end of said operating lever is provided with two opposing clip openings, a receiving groove is included in said actuating knob, said upper pull rope and said lower pull rope are attached to said two clip openings at said top end of said operating lever after passing through an annular hole at an outer end of said pull rod, said annular hole on said lug, and a hollow interior of said operating lever respectively.

12. The water-saving device of claim 9 wherein:

at least one of said pull rods comprises a first rod with a joint piece and a second rod with a joint piece, a first one of said joint pieces is provided with a plurality grooves, and a second one of said joint pieces is provided with ridges that are received in said grooves, said joint pieces are joined with a screw such that said first and said second rod can be held in different orientations, said orientations being defined by which grooves receive said ridges.

13. The water-saving device of claim 1 wherein:

an outlet device is attached to one wall of said inlet pipe, a lateral pipe with an outlet extends from said inlet pipe, an outlet pipe is connected to the flush toilet, a plunger is provided inside said lateral pipe to close the passage of said outlet pipe by means of water pressure, a rod on an upper side wall of said inlet pipe includes an operating lever that pivots about a fulcrum shaft, one end of said operating lever is connected to said connecting rod of said lower outlet pipe through an outlet pull rope, another end of said operating lever presses against an end of said plunger; such that when said lower pull rope actuates said rod, said outlet pull rope pulls an end of said operating lever so that a second end of said operating lever depresses said plunger to open said passage of said outlet pipe.

14. The water-saving device of claim 13 wherein:

said outlet pull rope passes through an annular hole on said lower overflow pipe and an annular hole on said rod, and said pull rope is connected to said operating lever.

* * * * *